United States Patent [19]

Stefanutti et al.

[11] Patent Number: 5,776,288
[45] Date of Patent: Jul. 7, 1998

[54] METHOD AND APPARATUS FOR LINED CLUTCH PLATE

[75] Inventors: Oscar E. Stefanutti, Orchard Lake; John Willwerth, Rochester Hills; Gregory J. Guitar, Roseville, all of Mich.

[73] Assignee: Automotive Composites Company, Sterling Heights, Mich.

[21] Appl. No.: 648,301

[22] Filed: May 7, 1996

[51] Int. Cl.$^6$ .............................. B32B 31/18; F16D 13/68
[52] U.S. Cl. .................... 156/263; 156/265; 192/107 R; 192/113.36
[58] Field of Search ................... 192/70.14, 113.36, 192/107 R; 156/265, 266, 263, 269, 517, 521

[56] References Cited

U.S. PATENT DOCUMENTS

| | | | |
|---|---|---|---|
| 2,749,264 | 6/1956 | Emrick | 192/113.36 X |
| 2,947,388 | 8/1960 | Culbertson | 192/107 R X |
| 2,966,737 | 1/1961 | Spokes et al. | 192/107 R X |
| 3,250,349 | 5/1966 | Byrnes et al. | 192/107 R X |
| 4,260,047 | 4/1981 | Nels . | |
| 4,449,621 | 5/1984 | F'Geppert | 192/70.14 X |
| 4,502,581 | 3/1985 | Komatsu . | |
| 4,585,104 | 4/1986 | Komatsu . | |
| 4,674,616 | 6/1987 | Mannino | 192/113.36 X |
| 5,094,331 | 3/1992 | Fujimoto et al. . | |
| 5,184,704 | 2/1993 | Hays . | |
| 5,332,075 | 7/1994 | Quigley et al. . | |
| 5,409,091 | 4/1995 | Reik et al. . | |
| 5,413,202 | 5/1995 | Maucher . | |
| 5,419,422 | 5/1995 | Schraut . | |
| 5,460,255 | 10/1995 | Quigley . | |
| 5,571,372 | 11/1996 | Miyaishi et al. | 156/521 X |
| 5,605,210 | 2/1997 | Koike et al. | 192/70.14 X |
| 5,615,758 | 4/1997 | Nels | 192/113.36 |

OTHER PUBLICATIONS

Abstract of Publication No. 07–197,945, published Aug. 1, 1995, Appln. No. 05–349,112 [JP 93349112] to Fuji Polymertech KK.

Abstract of Publication No. 03–028523, published Feb. 6, 1991, Appln. No. 01–160,866 [JP 89160866], filed Jun. 26, 1989 to Tochigi Fuji Ind. Co. Ltd.

Abstract of Publication No. 60–172,727, published Sep. 6, 1985, Appln. No. 59–025,908 [JP 8425908], filed Feb. 14, 1984 to Fuji Kagaku Kogyo KK.

Abstract of Publication No. 60–164,048, published Aug. 27, 1985, Appln. No. 59–019269 [JP 8419269], filed Feb. 3, 1984 to Tochigi Fuji Ind. Co. Ltd.

Abstract of Publication No. 60–164,047, published Aug. 27, 1985, Appln. No. 59–019109 [JP 8419109], filed Feb. 2, 1984 to Tochigi Fuji Ind. Co. Ltd.

*Primary Examiner*—Rodney H. Bonck
*Attorney, Agent, or Firm*—Brooks & Kushman P.C.

[57] ABSTRACT

A method and apparatus for assembling a clutch plate includes forming arcuate segments from a friction material sheet, applying the arcuate segments to the ring in a fixed location with a temporary adherent, preferably to define intermediate spaces between the arcuate segments, and bonding the arcuate segments to the annular ring surface to form an automatic transmission clutch plate. Preferably, a set of multiple arcuate segments with independent edge boundaries are applied in a single workstation, and one or more sets may be applied to each annular surface by appropriately indexing the ring with respect to the application equipment. Preferably, the arcuate segments are formed by stamping the segments from sheets, the cuttings arranged at closely spaced positions on the sheet to reduce friction material waste. Preferably, the stamping die displaces the cut arcuate segment to its fixed location on the annular ring. The preferred embodiment includes a lined clutch plate in which spaces between adjacent arcuate segments of friction material form lubrication grooves from the radially inner edge to the radially outer edge of the clutch plate ring.

12 Claims, 2 Drawing Sheets

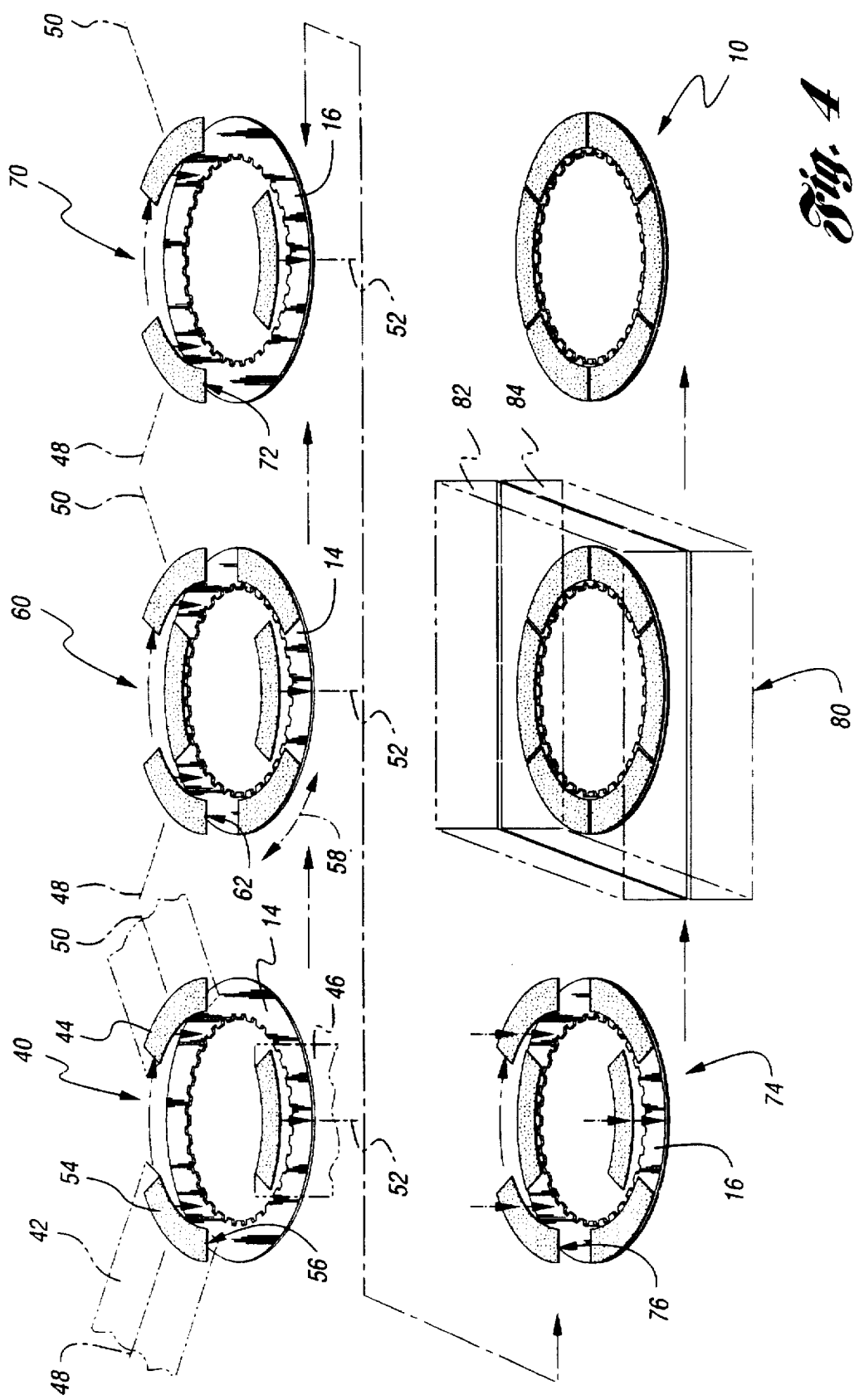

METHOD AND APPARATUS FOR LINED CLUTCH PLATE

TECHNICAL FIELD

The present invention relates generally to automatic transmission clutch plates, and more particularly to the method for forming and applying arcuate segments of friction-lining material to the side of the of an annular ring and bonding to assemble a clutch plate.

BACKGROUND ART

Automatic transmission clutch plates are flat annular rings having a friction lining applied to the annular sides. One or both sides are often covered with an annular ring of friction material lining sized for mating engagement with adjacent plates similarly lined. A lubricating medium such as transmission oil may communicate with the lined outer sides of the clutch plates in the clutch plate assembly to control engagement of the adjacent clutch plates. The friction lining was often similarly shaped as an annular ring and the annular ring is cut from sheet material. However, removal of an annular ring from a sheet material leaves a substantial portion of sheet material residue, for example, the circular internal portion and triangular outer portions of the sheet material. As a result, a substantial amount of the sheet of friction material is wasted during the production and assembly of lined clutch plates.

One previously known assembly eliminates the large areas of waste by cutting the friction lining as arcuate segments. However, the previously known process provided arcuate segments having interlocking end portions so that the segments are interconnected for accurate alignment on the sides of the annular ring forming the clutch plate. This interconnection and alignment assures proper installation of the friction lining on the side surface of the clutch plate ring. However, the interconnection of the segments complicates installation of the lining on the plate ring, since each segment must be handled so as to avoid disconnection of the interlocking tabs and slots of the friction lining segments. The connection forms an annular ring of separatable but interconnecting segments that must be transferred simultaneously to the side of the clutch plate ring. Moreover, the friction material must be modified before or after installation to include grooves, for example, by hot molding a plurality of parallel grooves in the friction material sheet, to provide fluid passages for lubrication communication between radially inner and outer edges of the clutch plate.

In addition, it has also been known to extrude a long strand of friction material having a relatively small cross-section. The strand is then sliced into multiple small segments that can be applied to a clutch plate ring. However, such a structure substantially multiplies the number of pieces that must be formed, located and adhered to the ring. Accordingly, such an assembly can increase the opportunity to misalign the segments with respect to the annular shape of the ring and the adjacent segments. In addition, such a construction limits the ability to configure communication passages as spacings between the sliced segments and limits surface area of exposed friction lining.

SUMMARY OF THE INVENTION

The present invention overcomes the abovementioned disadvantages by providing a method for lining a clutch plate ring, and an assembled clutch plate, that includes arcuate segments of friction material lining at spaced, adjacent positions along an annular clutch plate ring. The method improves production by limiting waste of friction material as the arcuate segments can be formed at closely aligned positions to improve the area of the sheet of friction material to be utilized in forming the arcuate segments. In addition, the step of applying a plurality of segments to a side of the disk locates them in spaced, adjacent positions to provide lubrication channels without preforming or otherwise shaping the applied friction material. In addition, the arcuate segments are bonded at the spaced, adjacent positions by an adherent, preferably carried by the ring or the friction material, to be used in forming the clutch plate.

In the preferred embodiment, a plurality of forming presses, each press forming a plurality of segments by stamping from a sheet at closely spaced locations along an elongated sheet of friction material. Preferably, a plurality of presses at a stamping station are aligned at separated positions for applying multiple segments to a single ring. In addition, the station or adjacent stations index the ring so that additional sets of arcuate segments can be applied between previously aligned segments, or on both first and second sides of the ring before the bonding step is executed to adhere the arcuate segments at spaced adjacent locations on the annular ring.

The present invention also provides a lined clutch plate on which an adherent secures a plurality of spaced adjacent arcuate segments on an annular ring, an intermediate portion of the ring between arcuate segments forming a groove for lubrication communication from the radially inner edge to the radially outer edge of the clutch plate. The grooves may be aligned as desired, or avoided if preformed or subsequently formed grooves are available, for example by pressing grooves during the bonding operation, for lubrication passages.

Thus, the present invention avoids the need for complex interlocking relationships between adjacent arcuate segments of lining configured to a clutch plate ring. In addition, the invention improves efficient use of friction material sheets by stamping closely spaced adjacent arcuate segments. Moreover, the forming or applying apparatus segment may be aligned along multiple axes for installing multiple segments at separated positions along the annular ring, and indexing the ring to align multiple sets of arcuate segments at separated positions.

The clutch plate assembly includes channels or grooves between edges of adjacent arcuate segments to provide lubrication passageways between the radially inner and outer portions of the clutch plate where the friction material is not subjected to a grooving operation. Alternatively, the segments can be closely positioned where grooves are preformed in the friction material or are incorporated after application, for example, during a pressurized bonding operation. In addition, one or both opposing sides of the clutch plate ring can be provided with friction material, the number, size and shape of the arcuate segments being adjustable to improve production efficiency.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which:

FIG. 4 is a perspective view of workstations performing method steps in accordance with the method of the present invention.

DETAILED DESCRIPTION OF THE PREFERRED EMBODIMENT

Figure 1:
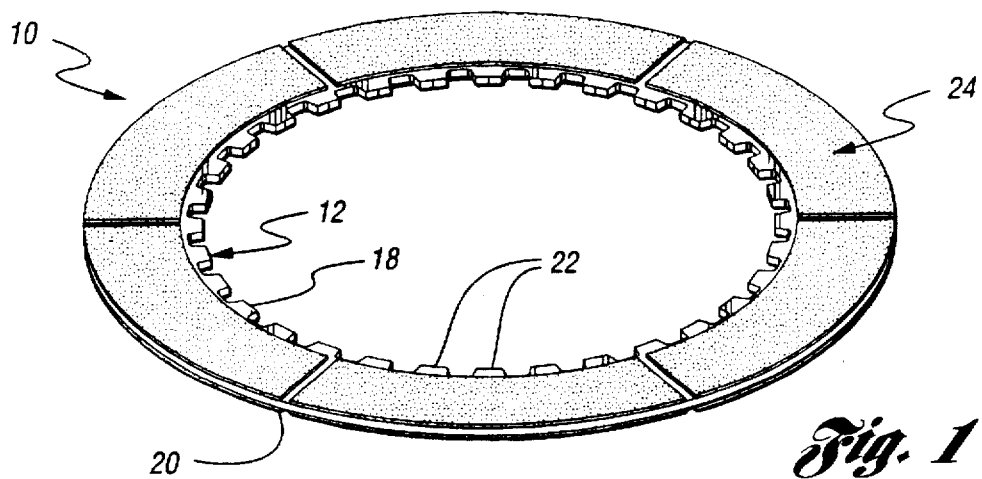
FIG. 1 is a perspective view of a clutch plate constructed in accordance with the present invention.

Referring first to FIG. 1, a clutch plate 10 is thereshown comprising an annular substrate or ring 12, preferably a metal plate such as steel. The ring 12 has annular sides 14 and 16 between a radially inner edge 18 and a radially outer edge 20. The inner or outer radial edge may include a plurality of splined teeth 22 for engagement with splines in a well known manner for use in automatic transmissions. As is also well known, each of the annular sides 14 and 16 of the ring 12 carry a lining 24, although only one or both sides may be lined.

Figure 2:
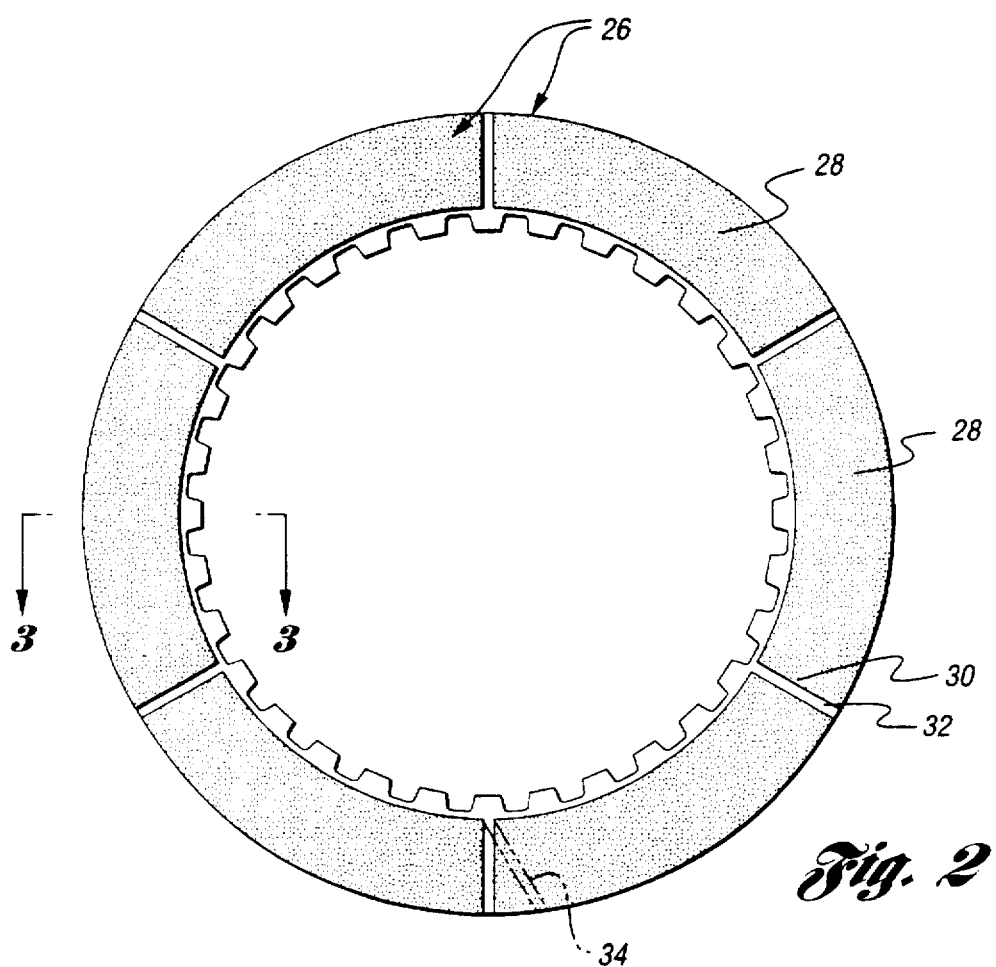
FIG. 2 is a plan view of the clutch plate shown in FIG. 1.
Figure 3:
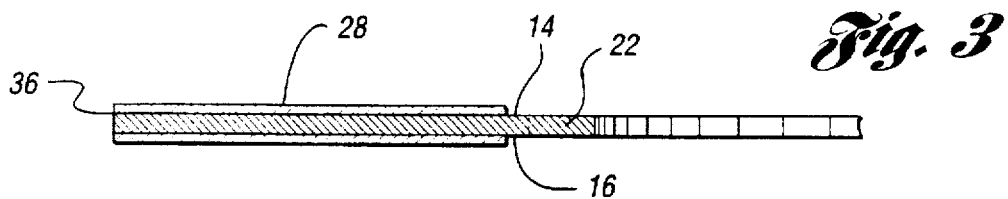
FIG. 3 is a sectional view taken substantially along the line 3—3 in FIG. 2.

As best shown in FIG. 2, a lining 24 comprises a plurality of arcuate segments 26. In the preferred embodiment, each segment 28 is sized to cover a portion of the annular surface and preferably has an outer contour matching an edge of the annular ring as shown in FIGS. 2 and 3. For example, a segment length slightly less than about ⅙ of the annular surface 14 or 16 is shown in FIG. 2. In addition, each arcuate segment 28 has radially aligned edges that are substantially parallel to each other, although it is to be understood that the circumferential edges 30 are independent edge boundaries that can be aligned at other angles or aligned at angles with respect to each other depending upon the need for lubrication passage, the number of spaces, and the directions in which the passages are formed in the spacing 32. For example, an inclined spacing between segments 28 is shown in phantom line at 34. Moreover, lubrication passages may be pressed or otherwise formed in the friction material, whereby the independent edge boundaries, that is, the segment ends without interdigitated tabs and slots, may abut each other.

In the preferred embodiment, the ring 12 is stamped from a coated metal sheet, the coating 36 preferably comprises a commercially available adhesive. The layer of adhesive coating forms a temporary bond when adjacent segments 28 are positioned upon the ring as well as a permanent bond between the lining 24 and the ring 12 when bonded to the ring in a manner to be described in greater detail below. Nevertheless, other methods of interposing an adherent between the lining and the ring 12 are also within the scope of the present invention, and a separate adherent coating step could be performed during the assembly of the lining to the ring. Typically, a thermosetting adherent may be tacky upon partial heating when the segments 28 are engaged against the surface of the ring to fixedly locate the segments in position on the surfaces 14 and 16. The bonding step preferably provides enhanced application of heat under pressure for a time duration in a manner consistent with known bonding processes to permanently bond the lining 24 to the ring 12. Nevertheless, it will be understood that the parameters of time, temperature and pressure may vary as necessary depending on the composition of the friction material, the adherent and the substrate.

Referring now to FIG. 4, a workstation 40 is thereshown in which a step of forming arcuate segments 28 of friction material is represented. Preferably, to form segments of the size and shape of segments 28, three sheets 42, 44 and 46 of friction material are shown aligned along mutually spaced feed paths 48, 50 and 52 aligned at 120° to the adjacent paths. Along each path, a cutter such as a stamping die 54 forms an arcuate segment 28 from the respective sheets 42, 44 and 46. At each segment cutting location, the stamping can be displaced toward the ring, for example, by movement of the die, and pressed into a fixed location on the annular surface 14 of the ring 12. Pressing of the first set 56 of the multiple segments 28 are positioned in registration with the centerline of paths 48, 50 and 52 to cover separated portions of the surface 14.

As shown at station 60, the first set 56 of segments 28 are shown indexed by rotation of the ring as shown diagrammatically by arrow 58 so that the unlined surface portions of the ring 12 are aligned along the axes 48, 50 and 52, respectively. Accordingly, a second set 62 of arcuate segments 28 are stamped and applied to the surface 14 at locations intermediate the segment locations of the first set 56. Of course, it is to be understood that the stations 40 and 60 are not necessarily physically separated, and may represent two functional modes of a single work station. In addition, the number of segments and total number of stations utilized is optional.

Additional but optional forming and applying steps are represented at station 70 where a third set 72 of arcuate segments 28 are applied to the opposite side annular surface 16 of the ring 12 after an indexing operation exposes the surface 16, for example, flipping the ring on its fixture. Similarly, at station 74, a fourth set 76 of arcuate segments 28 is applied after rotary indexing of the ring, preferably similar to that described with reference to 58, to apply a fourth set 76 at locations intermediate the locations of segments in the first set 72 of arcuate segments 28 on the surface 16.

When all of the arcuate segments of friction material have been applied, and temporarily held in fixed locations, that preferably define the intermediate spaces forming lubrication passages when the friction material is not grooved or not to be grooved during bonding, the assembled clutch plate is prepared for bonding by delivery to a station 80 at which heat and pressure are applied to the composite in a well known manner. The assembled clutch plate 10 is then ready for assembly with other clutch plates in an automatic transmission in a well known manner.

Having thus described the present invention, many modifications thereto will become apparent to those skilled in the art to which it pertains without departing from the scope and spirit of the present invention as defined in the appended claims. For example, sheets of friction material may already have preformed grooves, so that the spaces 32 may be eliminated and that the edges 30 of each arcuate segment will be applied to abut against each other for enhancing the exposed area of friction material on the clutch plate. In addition, the size and number of arcuate segments and the sequence of steps used in forming and applying the arcuate segments of friction material may be varied without departing from the scope and spirit of the present invention as defined in the appended claims.

What is claimed is:

1. A method for lining annular sides of clutch plates with friction material, comprising: forming arcuate segments from a sheet of friction material;

applying a plurality of said segments at spaced, adjacent positions from a plurality of radial directions upon at least one side of an annular clutch plate to form intermediate channels between said arcuate segments; and bonding said plurality of segments at said spaced, adjacent positions.

2. The invention as defined in claim 1 wherein said forming step comprises stamping arcuate segments.

3. The invention ad defined in claim 2 wherein said arcuate segments are stamped from closely adjacent strip portions of said sheet.

4. The invention as defined in claim 1 wherein said forming step comprises sequentially stamping at least one elongated strip having closely adjacent arcuate strip portions.

5. The invention as defined in claim 1 wherein said forming step comprises simultaneously forming a plurality of said segments in alignment with said spaced, adjacent positions.

6. The invention as defined in claim 1 wherein said applying step comprises pressing a plurality of segments upon said clutch plate at mutually spaced positions.

7. The invention as defined in claim 6 wherein said applying step comprises pressing a plurality of segments on opposite sides of said clutch plate.

8. The invention as defined in claim 1 wherein said spaced positions are arranged in a plurality of sets and said applying step comprises applying a first set of segments before applying a second set of segments, each segment of said second set being applied at a position intermediate adjacent said positions of said first set.

9. The invention as defined in claim 8 wherein said first set comprises mutually separated segments.

10. The invention as defined in claim 1 wherein said bonding step comprises pressurized engagement of said segments against said clutch plate.

11. The invention as defined in claim 1 wherein said pressing step comprises heating at least one of said segments and said clutch plate.

12. The invention as defined in claim 1 wherein said pressing step includes limiting said pressing step for a predetermined time duration.

* * * * *